US005969303A

United States Patent [19]

Piserchia et al.

[11] Patent Number: 5,969,303

[45] Date of Patent: Oct. 19, 1999

[54] EMERGENCY STOP CIRCUIT FOR A DIRECT CURRENT ELEVATOR DRIVE

[75] Inventors: Gerard G. Piserchia, Emerson; Julio C. Ramos, Lake Hiawatha, both of N.J.

[73] Assignee: Inventio AG, Hergiswil NW, Switzerland

[21] Appl. No.: 09/041,999

[22] Filed: Mar. 17, 1998

[51] Int. Cl.[6] .................................. B66B 1/28; H02P 3/12

[52] U.S. Cl. .......................... 187/297; 318/381; 318/375; 187/288

[58] Field of Search .................................... 187/297, 288, 187/289, 290, 294, 295; 318/375, 376, 381, 380, 379

[56] References Cited

U.S. PATENT DOCUMENTS

| | | | |
|---|---|---|---|
| 3,448,364 | 6/1969 | Keiper | 318/381 |
| 3,656,039 | 4/1972 | Konrad | 318/138 |
| 4,039,914 | 8/1977 | Steigerwald et al. | 318/375 |
| 4,307,793 | 12/1981 | Caputo | 187/29 R |
| 4,386,299 | 5/1983 | Pham | 318/261 |
| 4,426,610 | 1/1984 | Kawada et al. | 318/798 |
| 4,672,277 | 6/1987 | Makinen et al. | 318/380 |
| 5,285,029 | 2/1994 | Araki | 187/114 |
| 5,332,954 | 7/1994 | Lankin | 318/139 |
| 5,361,022 | 11/1994 | Brown | 318/375 |
| 5,642,023 | 6/1997 | Journey | 318/493 |

FOREIGN PATENT DOCUMENTS 56-101386 8/1981 Japan .

*Primary Examiner*—Robert E. Nappi

*Attorney, Agent, or Firm*—MacMillan, Sobanski & Todd, LLC

[57] ABSTRACT

An emergency stop circuit for an elevator drive includes an emergency stop control (7) that selectively varies the current flowing in a field winding (4) of a direct current drive motor (M). During an emergency stop, the motor (M) operates as a generator and has an armature winding (1) loaded with a braking resistor (9) to apply a voltage, depending on the direction of movement of the elevator car, either by a first switch (10) and a second switch (11), or by a third switch (12) and a fourth switch (13). The switches (10, 11, 12, 13) are connected as an H-bridge between the windings (1, 4) and are controlled by the emergency stop control (7) depending on the deceleration required by the elevator car, for example by pulse operation depending based upon a preset deceleration value and a measured deceleration value from a deceleration sensor (14) mounted on the car.

10 Claims, 1 Drawing Sheet

EMERGENCY STOP CIRCUIT FOR A DIRECT CURRENT ELEVATOR DRIVE

BACKGROUND OF THE INVENTION

The invention pertains to an emergency stop circuit for a direct current elevator drive, the drive including a direct current motor with an armature winding and a field winding, where in the case of an emergency stop a damping resistance is switched across the armature winding and current is shunted to the field winding to produce a torque for the deceleration of the elevator car and a counterweight.

In elevator systems, essential system defects, such as, for example, power outage, defects in the security circuit etc., cause an emergency stop, where the elevator car is immediately braked or, stopped. In the case of a direct current drive, the motor is disconnected from the electrical supply and a resistance switched across the armature circuit of the motor. The voltage generated across the resistance supplies the field winding of the motor with current. The armature and the field together generate a motor torque for the deceleration of the elevator car and the counterweight. Jointly the deceleration of the elevator drive is composed of the motor torque and the application of braking torque by a mechanical brake. The total torque has to be calculated in such a way that the braking of the elevator car at full load is assured within a certain stopping distance.

It is a disadvantage of the known emergency stop devices that for a deceleration designed for full load, the elevator car is excessively braked, for example at partial load, such as with a single passenger. In this case, undesired forces act on the passenger and on the parts of the elevator. Besides, there exists also the danger that the counterweight can jump in an upward direction transmitting a shock to the car.

SUMMARY OF THE INVENTION

The present invention solves the problem of avoiding the disadvantages of the known emergency stop devices and creates an emergency circuit in which the deceleration of the elevator car and of the counterweight is independent of the loading of the elevator car. A direct current elevator drive includes a direct current motor for moving an elevator car and a counterweight in an elevator shaft and having an armature winding and a field winding. During an emergency stop, a braking resistance is connected across the armature winding by closing a normally open switch contact to apply a voltage across the field winding. A plurality of control switches are connected between the armature winding and the field winding and are connected to an emergency stop control. The emergency stop control selectively controls the switches to vary the direct current flowing in the field winding to generate a torque for deceleration of the elevator car and the counterweight driven by the drive.

The advantages attained by the invention are that the potential for discomfort or injury to passengers due to high deceleration values is eliminated. In particular, in hospitals, nursing homes and old peoples' homes, where the elevator users are more sensitive to forces caused by extreme deceleration, the present invention is particularly useful.

It is of further advantage that in the case of an emergency stop, the slippage of the cable on the traction sheave can be avoided by means of the emergency stop circuit according to the present invention.

It is further advantageous that no time consuming adjustments of the brake resistance and of the brake springs of the mechanical brake are necessary in order to achieve an optimal deceleration. The brake can be adjusted to a typical value. The precise adjustment is accomplished by the emergency stop circuit itself.

It is another advantage that in the case of an emergency stop, the emergency stop circuit controls the field winding current and not the armature current. Therefore, considerably less expensive switching devices can be used since heavy-duty circuit breakers are not required.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
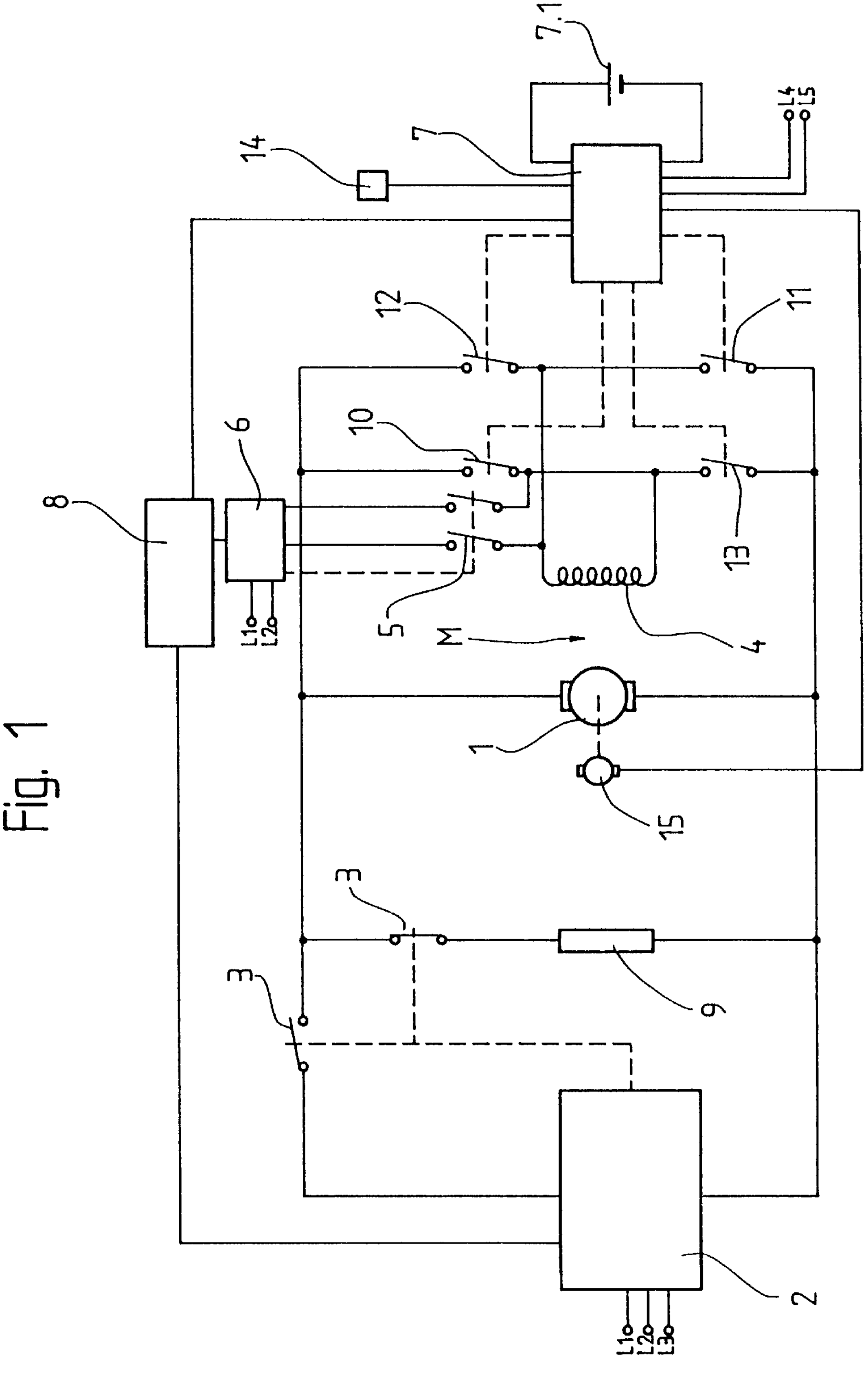
FIG. 1 is a schematic block diagram of an emergency stop circuit according to the present invention for a controlled emergency stop of a direct current elevator drive.

There is shown in the FIG. 1 an armature winding 1 of a direct current motor M driving an elevator car and a counterweight (not shown), which in normal operation is supplied by a direct current supply 2, for example a converter with controllable heavy-duty switches. The bipolar direct current supply 2 has an input connected to a supply line L1, L2, L3, typically a three phase power source, and can generate a potential with a +/− polarity or a −/+ polarity at an output connected across the armature winding 1. A reversing switch 3 has a closing contact 3.1 connected in series with the supply 2 and the armature winding 1 and an opening contact 3.2 connected in parallel with the armature winding. In normal operation, the closing contact 3.1 of the reversing switch 3 is closed (not shown) and the opening contact 3.2 of the reversing switch is open (not shown). Thus, the supply 2 provides direct current power to the armature winding 1. The reversing switch 3 is controlled by the direct current supply 2, as illustrated by a broken line. In the case of an emergency stop, the closing contact 3.1 of the reversing switch 3 is opened and the opening contact 3.2 is closed as shown in the FIG. 1.

During normal operation, a field winding 4 of the direct current motor M is connected by means of two contacts of a circuit breaker 5 to an output of a bipolar field supply 6, for example a controllable rectifier with a +/− polarity or a −/+ polarity. The bipolar field supply 6 has an input connected to the supply line L1, L2. In the case of an emergency stop, the contacts of the circuit breaker 5 are normally open as shown in the FIG. 1. However, for assistance of the emergency stop, the breaker contacts can be closed to connect the field winding 4 to the field supply 6. The direct current supply 2, the field supply 6 and an emergency stop control 7 are connected to and receive control commands from a superimposed elevator control 8. The emergency stop control 7 has an input connected to a mains supply L4, L5 and is supported in the case of a power supply outage by a battery 7.1.

In the case of an emergency stop, the emergency stop control 7 takes over the control of the excitation of the field winding 4. In this case, the contacts of the reversing switch 3 and the circuit breaker 5 are in the position shown in the FIG. 1. The direct current motor M, working as a generator, is loaded by a braking resistance 9 connected across the armature winding 1 by the opening contact 3.2. The field winding 4 is supplied with a voltage arising in the motor armature winding 1 by means of a first switch 10 and a second switch 11, or by means of a third switch 12 and a fourth switch 13, depending on the direction of motion of the elevator car. The switches 10, 11, 12, 13 are shown symbolically as forming an H-bridge connected between the armature winding 1 and the field winding 4. These switches are electronically controllable semiconductor switches such as, for instance, GTOs, IGBTs, etc., and are controlled by the emergency stop circuit 7, as shown with the broken line, for example by means of pulse operation depending on the necessary deceleration.

The control of the switches 10, 11, 12, 13 can take place, for example, according to a given deceleration reference value and a constant actual value measured by means of a deceleration sensor 14 arranged on the elevator car and connected to an input of the control 7. The actual value is compared with the reference value and the width of control pulses for the switches 10, 11, 12, 13 are changed correspondingly with the difference of the reference to actual value, which will change the current flowing through the field winding 4 and thus also the torque of the motor M. The reference value of the deceleration, for example, can also have a pattern in which smaller deceleration values are generated at the start and at the end of the emergency stop.

The reference value of deceleration can also be based on the distance still available for the braking of the elevator car, which is especially important at the ends of the shaft. The emergency stop control 7 recognizes, based on a signal from an impulse generator 15 arranged on the shaft of the motor M, or on the drive shaft, the momentary position of the elevator car. The emergency stop control 7 recognizes the elevator shaft height and the momentary direction of travel as well as the velocity of the elevator car at the beginning of the emergency stop. From these data the emergency stop control 7 can determine the necessary references of deceleration.

Based on the signal from the pulse generator 15, the signal from the deceleration sensor 14 and the instantaneously existing velocity of the elevator car at the beginning of the emergency stop, the emergency stop control 7 can also determine whether slip caused by too high deceleration values exists between the traction sheave and the cables guided by means of the traction sheave to which the elevator car and the counterweight are attached and in which the travel of the traction sheave and the elevator car are compared. In case slip exists, the emergency stop control 7 reduces the deceleration reference value.

In summary, the present invention relates to a direct current elevator drive including: the direct current motor M for moving an elevator car and a counterweight in an elevator shaft and having the armature winding 1 and the field winding 4; the braking resistance 9 connected across the armature winding by the normally open switch contact 3.2; the plurality of control switches 10, 11, 12, 13 connected between the armature winding and the field winding; and the emergency stop control 7 connected to the control switches. During an emergency stop, the switch contact 3.2 is closed to direct current flowing in the armature winding 1 into the field winding 4 to generate a torque for deceleration of an elevator car and a counterweight driven by the drive. The emergency stop control 7 selectively varies the current flow through the field winding 4 thereby selectively controlling the deceleration of the elevator car and the counterweight.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An emergency stop circuit for a direct current elevator drive, the drive including a direct current motor with an armature winding and a field winding, where in case of an emergency stop a braking resistance is switched across the armature winding and current flowing in the armature winding is directed into the field winding which generates a torque for the deceleration of an elevator car and a counterweight driven by the drive, the emergency stop circuit comprising:

an emergency stop control connected to the field winding of the motor for selectively varying of the current flow through the field winding thereby selectively controlling the deceleration of the elevator car and the counterweight; and a deceleration sensor connected to said emergency stop control for sensing deceleration of the elevator car and providing a signal representing the deceleration of the elevator car wherein said emergency stop control varies the current flowing in the field winding according to a difference between a deceleration value sensed by said deceleration sensor and a preset deceleration value.

2. The emergency stop circuit according to claim 1 including a control device connected to the field winding and said emergency stop control and being responsive to control signals generated by said emergency stop control for the varying an amount of current flowing in the field winding.

3. The emergency stop circuit according to claim 2 wherein said control device includes a plurality of controllable semiconductor switches for connecting the field winding across the armature winding.

4. The emergency stop circuit according to claim 3 wherein said semiconductor switches are connected in an H-bridge configuration between the armature winding and the field winding.

5. The emergency stop circuit according to claim 1 wherein said emergency stop control includes a current supply supported by a battery.

6. The emergency stop circuit according to claim 1 wherein said emergency stop control changes said preset deceleration value in response to sensing slip between a traction sheave driven by the motor and cables carrying the elevator car and the counterweight.

7. The emergency stop circuit according to claim 1 wherein said emergency stop control changes said preset deceleration value in response to sensing a travel distance between the elevator car and an end of an elevator shaft in which the elevator car is travelling.

8. A direct current elevator drive comprising:

a direct current motor for moving an elevator car and a counterweight in an elevator shaft and having an armature winding and a field winding;

a braking resistance connected across said armature winding by a normally open switch contact;

a plurality of control switches connected between said armature winding and said field winding;

an emergency stop control connected to said control switches whereby during an emergency stop, said switch contact is closed to direct current flowing in said armature winding into said field winding to generate a torque for deceleration of an elevator car and a counterweight driven by the drive, said emergency stop control selectively varying the current flow through said field winding thereby selectively controlling the deceleration of the elevator car and the counterweight; and said emergency stop circuit including a deceleration sensor connected to said emergency stop control for sensing deceleration of the elevator car and providing a signal representing the deceleration of the elevator car and wherein said emergency stop control varies the current flowing in the field winding according to a difference between a deceleration value sensed by said deceleration sensor and a preset deceleration value.

9. The emergency stop circuit according to claim 8 wherein said emergency stop control changes said preset deceleration value in response to sensing slip between a traction sheave driven by the motor and cables carrying the elevator car and the counterweight.

10. The emergency stop circuit according to claim 8 wherein said emergency stop control changes said preset deceleration value in response to sensing a travel distance between the elevator car and an end of an elevator shaft in which the elevator car is travelling.

* * * * *